US012795321B2

(12) United States Patent
Vilkamo et al.

(10) Patent No.: US 12,795,321 B2
(45) Date of Patent: Nov. 10, 2026

(54) SPATIAL AUDIO REPRESENTATION AND RENDERING

(71) Applicant: Nokia Technologies Oy, Espoo (FI)

(72) Inventors: Juha Vilkamo, Helsinki (FI); Mikko-Ville Laitinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 79 days.

(21) Appl. No.: 18/952,319

(22) Filed: Nov. 19, 2024

(65) Prior Publication Data

US 2025/0080942 A1 Mar. 6, 2025

Related U.S. Application Data

(63) Continuation of application No. 17/766,812, filed as application No. PCT/FI2020/050639 on Sep. 29, 2020, now Pat. No. 12,185,084.

(30) Foreign Application Priority Data

Oct. 11, 2019 (GB) ..................................... 1914712

(51) Int. Cl.

| | |
|---|---|
| ***H04S 7/00*** | (2006.01) |
| ***G10L 25/18*** | (2013.01) |
| ***G10L 25/21*** | (2013.01) |

(52) U.S. Cl.

CPC .............. *H04S 7/305* (2013.01); *G10L 25/18* (2013.01); *G10L 25/21* (2013.01); *H04S 2420/01* (2013.01)

(58) Field of Classification Search

CPC ...... H04S 7/305; H04S 2420/01; H04S 1/007; H04S 2420/11; H04S 3/008; H04S 2400/15; H04S 2420/03; H04S 7/30; G10L 25/18; G10L 25/21; G10L 19/167; G10L 19/008; G10K 15/12

See application file for complete search history.

(56) References Cited

U.S. PATENT DOCUMENTS

| | | | | |
|---|---|---|---|---|
| 9,940,922 | B1 * | 4/2018 | Schissler | H04S 7/305 |
| 10,393,571 | B2 | 8/2019 | Shi | |
| 10,559,295 | B1 * | 2/2020 | Abel | H04S 7/305 |

(Continued)

FOREIGN PATENT DOCUMENTS

| | | | |
|---|---|---|---|
| CN | 107835483 | A | 3/2018 |
| EP | 2614445 | B1 | 12/2016 |

(Continued)

*Primary Examiner* — Xu Mei

(74) *Attorney, Agent, or Firm* — McCarter & English, LLP

(57) ABSTRACT

An apparatus configured to: obtain parameter values for configuring a reverberator; receive a spatial audio signal comprising at least one audio signal and spatial metadata; obtain a room effect control indication; and in response to a determination that a room effect is to be applied to the spatial audio signal: generate a first part binaural audio signal based on the at least one audio signal and the spatial metadata; generate a second part binaural audio signal based on the at least one audio signal, wherein at least the second part binaural audio signal is generated with at least in part the room effect so as to have a different response than a response of the first part binaural audio signal, wherein the second part binaural audio signal is generated with the configured reverberator; and combine the first part binaural audio signal and the second part binaural audio signal.

20 Claims, 5 Drawing Sheets

(56) References Cited

U.S. PATENT DOCUMENTS

| | | | | |
|---|---|---|---|---|
| 2010/0119075 | A1* | 5/2010 | Xiang ....................... | H04S 7/30 381/63 |
| 2012/0076305 | A1* | 3/2012 | Virolainen ............ | H04M 3/568 381/17 |
| 2013/0272527 | A1 | 10/2013 | Oomen et al. | |
| 2015/0350801 | A1 | 12/2015 | Koppens | |
| 2019/0246236 | A1 | 8/2019 | Ehara | |
| 2021/0051430 | A1 | 2/2021 | Eronen | |
| 2022/0240038 | A1 | 7/2022 | Eronen | |
| 2022/0303710 | A1 | 9/2022 | Vilkamo | |

FOREIGN PATENT DOCUMENTS

| | | | |
|---|---|---|---|
| GB | 2571949 | A | 9/2019 |
| GB | 2572420 | A | 10/2019 |
| GB | 2572650 | A | 10/2019 |
| JP | 2013541275 | A1 | 11/2013 |
| WO | WO-2014111765 | A1 | 7/2014 |
| WO | WO-2018079254 | A1 | 5/2018 |
| WO | 2018182274 | A1 | 10/2018 |
| WO | WO-2019086757 | A1 | 5/2019 |
| WO | WO-2014111829 | A1 | 7/2019 |
| WO | WO-2019193248 | A1 | 10/2019 |

* cited by examiner

SPATIAL AUDIO REPRESENTATION AND RENDERING

RELATED APPLICATION

This application is a continuation of United States Patent Application 17/766,812, filed Apr. 6, 2022, which is a National Stage Entry of International Application No. PCT/FI2020/050639, filed Sep. 29, 2020. Both applications are hereby incorporated by reference in their entirety, and claim priority to GB 1914712.3 filed Oct. 11, 2019.

FIELD

The present application relates to apparatus and methods for spatial audio representation and rendering, but not exclusively for audio representation for an audio decoder.

BACKGROUND

Immersive audio codecs are being implemented supporting a multitude of operating points ranging from a low bit rate operation to transparency. An example of such a codec is the Immersive Voice and Audio Services (IVAS) codec which is being designed to be suitable for use over a communications network such as a 3GPP 4G/5G network including use in such immersive services as for example immersive voice and audio for virtual reality (VR). This audio codec is expected to handle the encoding, decoding and rendering of speech, music and generic audio. It is furthermore expected to support channel-based audio and scene-based audio inputs including spatial information about the sound field and sound sources. The codec is also expected to operate with low latency to enable conversational services as well as support high error robustness under various transmission conditions.

Input signals can be presented to the IVAS encoder in one of a number of supported formats (and in some allowed combinations of the formats). For example a mono audio signal (without metadata) may be encoded using an Enhanced Voice Service (EVS) encoder. Other input formats may utilize new IVAS encoding tools. One input format proposed for IVAS is the Metadata-assisted spatial audio (MASA) format, where the encoder may utilize, e.g., a combination of mono and stereo encoding tools and metadata encoding tools for efficient transmission of the format. MASA is a parametric spatial audio format suitable for spatial audio processing. Parametric spatial audio processing is a field of audio signal processing where the spatial aspect of the sound (or sound scene) is described using a set of parameters. For example, in parametric spatial audio capture from microphone arrays, it is a typical and an effective choice to estimate from the microphone array signals a set of parameters such as directions of the sound in frequency bands, and the relative energies of the directional and non-directional parts of the captured sound in frequency bands, expressed for example as a direct-to-total ratio or an ambient-to-total energy ratio in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

For example, there can be two channels (stereo) of audio signals and spatial metadata. The spatial metadata may furthermore define parameters such as: Direction index, describing a direction of arrival of the sound at a time-frequency parameter interval; level/phase differences; Direct-to-total energy ratio, describing an energy ratio for the direction index; Diffuseness; Coherences such as Spread coherence describing a spread of energy for the direction index; Diffuse-to-total energy ratio, describing an energy ratio of non-directional sound over surrounding directions; Surround coherence describing a coherence of the non-directional sound over the surrounding directions; Remainder-to-total energy ratio, describing an energy ratio of the remainder (such as microphone noise) sound energy to fulfil requirement that sum of energy ratios is 1; Distance, describing a distance of the sound originating from the direction index in meters on a logarithmic scale; covariance matrices related to a multi-channel loudspeaker signal, or any data related to these covariance matrices; other parameters guiding a specific decoder, e.g., centre prediction coefficients and one-to-two decoding coefficients (used, e.g., in MPEG Surround). Any of these parameters can be determined in frequency bands.

Listening to natural audio scenes in everyday environment is not only about sounds at particular directions. Even without background ambience, it is typical that the majority of the sound energy arriving to the ears is not from direct sounds but indirect sounds from the acoustic environment (i.e., reflections and reverberation). Based on the room effect, involving discrete reflections and reverberation, the listener auditorily perceives the source distance and room characteristics (small, big, damp, reverberant) among other features, and the room adds to the perceived feel of the audio content. In other words, the acoustic environment is an essential and perceptually relevant feature of spatial sound.

The listener will listen to music in normal rooms (as opposed to, e.g. anechoic chambers), and music (e.g., stereo or 5.1 content) is typically produced in a way that it is expected to be listened in a room with normal reverberation, which creates envelopment and spaciousness to the sound. Listening to normal music in an anechoic chamber is known to be unpleasant due to lack of room effect. Hence, normal music should be (and basically always is) listened to in normal rooms with reverberation.

SUMMARY

There is provided according to a first aspect an apparatus comprising means configured to: receive a spatial audio signal, the spatial audio signal comprising at least one audio signal and spatial metadata associated with the at least one audio signal; obtain a room effect control indication; and determine, based on the room effect control indication, whether a room effect is to be applied to the at least one audio signal, wherein the means is configured, when the room effect is to be applied to the spatial audio signal, to: generate a first part binaural audio signal based on the at least one audio signal and spatial metadata; generate a second part binaural audio signal based on the at least one audio signal, at least the second part binaural audio signal is generated with at least in part the room effect so as to have a different response than a response of the first part binaural audio signal; and combine the first part binaural audio signal and the second part binaural audio signal to generate a combined binaural audio signal.

The spatial metadata may comprise at least one direction parameter, and the means configured to generate a first part binaural audio signal based on the at least one audio signal and spatial metadata may be configured to generate the first part binaural audio signal based on the at least one audio signal and the at least one direction parameter.

The spatial metadata may comprise at least one ratio parameter and the means configured to generate a second part binaural audio signal based on the at least one audio signal may be further configured to generate the second part binaural audio signal based on the at least one audio signal and the at least one ratio parameter.

The at least one direction parameter may be a direction associated with a frequency band.

The means configured to generate the first part binaural audio signal based on the at least one audio signal and spatial metadata may be configured to: analyse the at least one audio signal to determine at least one stochastic property associated with the at least one audio signal; and generate the first part binaural audio signal further based on the at least one stochastic property associated with the at least one audio signal.

The at least one audio signal may comprise at least two audio signals and the means configured to analyse the at least one audio signal to determine at least one stochastic property associated with the at least one audio signal may be configured to estimate a covariance between the at least two audio signals, and wherein the means configured to generate the first part binaural audio signal further based on the at least one stochastic property associated with the at least one audio signal may be configured to: generate mixing coefficients based on the estimated covariance between the at least two audio signals; and mix the at least two audio signals based on the mixing coefficients to generate the first part binaural audio signal.

The means configured to generate mixing coefficients based on the estimated covariance between the at least two transport audio signals may be further configured to generate the mixing coefficients based on a target covariance.

The means may be further configured to: generate an overall energy estimate based on the estimated covariance; determine head related transfer function data based on the direction parameter; and determine the target covariance based on the head related transfer function data, the spatial metadata and the overall energy estimate.

The means configured to generate a second part binaural audio signal based on the at least one audio signal may be configured to apply a reverberator to the at least one audio signal.

The means configured to obtain a room effect control indication may be configured to perform at least one of: receive the room effect control indication as a flag set by an encoder of the spatial audio signal; receive the room effect control indication as a user input; determine the room effect control indication based on obtaining an indicator indicating a type of spatial audio signal; and determine the room effect control indication based on an analysis of the spatial audio signal to determine a type of spatial audio signal.

The at least one audio signal may be at least one transport audio signal generated by an encoder.

The second part binaural signal may have a temporal response longer than a temporal response of the first part binaural audio signal.

According to a second aspect there is provided a method comprising: receiving a spatial audio signal, the spatial audio signal comprising at least one audio signal and spatial metadata associated with the at least one audio signal; obtaining a room effect control indication; and determining, based on the room effect control indication, whether a room effect is to be applied to the at least one audio signal, wherein the method comprises, when the room effect is to be applied to the spatial audio signal: generating a first part binaural audio signal based on the at least one audio signal and spatial metadata; generating a second part binaural audio signal based on the at least one audio signal, at least the second part binaural audio signal being generated with at least in part the room effect so as to have a different response than a response of the first part binaural audio signal; and combining the first part binaural audio signal and the second part binaural audio signal to generate a combined binaural audio signal.

The spatial metadata may comprise at least one direction parameter, and generating a first part binaural audio signal based on the at least one audio signal and spatial metadata may comprise generating the first part binaural audio signal based on the at least one audio signal and the at least one direction parameter.

The spatial metadata may comprise at least one ratio parameter and generating a second part binaural audio signal based on the at least one audio signal may further comprise generating the second part binaural audio signal based on the at least one audio signal and the at least one ratio parameter.

The at least one direction parameter may be a direction associated with a frequency band.

Generating the first part binaural audio signal based on the at least one audio signal and spatial metadata may comprise: analysing the at least one audio signal to determine at least one stochastic property associated with the at least one audio signal; and generating the first part binaural audio signal further based on the at least one stochastic property associated with the at least one audio signal.

The at least one audio signal may comprise at least two audio signals and analysing the at least one audio signal to determine at least one stochastic property associated with the at least one audio signal may comprise estimating a covariance between the at least two audio signals, and wherein generating the first part binaural audio signal further based on the at least one stochastic property associated with the at least one audio signal may comprise: generating mixing coefficients based on the estimated covariance between the at least two audio signals; and mixing the at least two audio signals based on the mixing coefficients to generate the first part binaural audio signal.

Generating mixing coefficients based on the estimated covariance between the at least two transport audio signals may further comprise generating the mixing coefficients based on a target covariance.

The method may further comprise: generating an overall energy estimate based on the estimated covariance; determining head related transfer function data based on the direction parameter; and determining the target covariance based on the head related transfer function data, the spatial metadata and the overall energy estimate.

Generating a second part binaural audio signal based on the at least one audio signal may comprise applying a reverberator to the at least one audio signal.

Obtaining a room effect control indication may comprise at least one of: receiving the room effect control indication as a flag set by an encoder of the spatial audio signal; receiving the room effect control indication as a user input; determining the room effect control indication based on obtaining an indicator indicating a type of spatial audio signal; and determining the room effect control indication based on an analysis of the spatial audio signal to determine a type of spatial audio signal.

The at least one audio signal may be at least one transport audio signal generated by an encoder.

The second part binaural signal may have a temporal response longer than a temporal response of the first part binaural audio signal.

According to a third aspect there is provided an apparatus comprising at least one processor and at least one memory including a computer program code, the at least one memory and the computer program code configured to, with the at least one processor, cause the apparatus at least to: receive a spatial audio signal, the spatial audio signal comprising at least one audio signal and spatial metadata associated with the at least one audio signal; obtain a room effect control indication; and determine, based on the room effect control indication, whether a room effect is to be applied to the spatial audio signal, wherein the means is configured, when the room effect is to be applied to the spatial audio signal, to: generate a first part binaural audio signal based on the at least one audio signal and spatial metadata; generate a second part binaural audio signal based on the at least one audio signal, at least the second part binaural audio signal is generated with at least in part the room effect so as to have a different response than a response of the first part binaural audio signal; and combine the first part binaural audio signal and the second part binaural audio signal to generate a combined binaural audio signal.

The spatial metadata may comprise at least one direction parameter, and the apparatus caused to generate a first part binaural audio signal based on the at least one audio signal and spatial metadata may be caused to generate the first part binaural audio signal based on the at least one audio signal and the at least one direction parameter.

The spatial metadata may comprise at least one ratio parameter and the apparatus caused to generate a second part binaural audio signal based on the at least one audio signal may be further caused to generate the second part binaural audio signal based on the at least one audio signal and the at least one ratio parameter.

The at least one direction parameter may be a direction associated with a frequency band.

The apparatus caused to generate the first part binaural audio signal based on the at least one audio signal and spatial metadata may be caused to: analyse the at least one audio signal to determine at least one stochastic property associated with the at least one audio signal; and generate the first part binaural audio signal further based on the at least one stochastic property associated with the at least one audio signal.

The at least one audio signal may comprise at least two audio signals and the apparatus caused to analyse the at least one audio signal to determine at least one stochastic property associated with the at least one audio signal may be caused to estimate a covariance between the at least two audio signals, and wherein the apparatus caused to generate the first part binaural audio signal further based on the at least one stochastic property associated with the at least one audio signal may be caused to: generate mixing coefficients based on the estimated covariance between the at least two audio signals; and mix the at least two audio signals based on the mixing coefficients to generate the first part binaural audio signal.

The apparatus caused to generate mixing coefficients based on the estimated covariance between the at least two transport audio signals may be further caused to generate the mixing coefficients based on a target covariance.

The apparatus may be further caused to: generate an overall energy estimate based on the estimated covariance; determine head related transfer function data based on the direction parameter; and determine the target covariance based on the head related transfer function data, the spatial metadata and the overall energy estimate.

The apparatus caused to generate a second part binaural audio signal based on the at least one audio signal may be caused to apply a reverberator to the at least one audio signal.

The apparatus caused to obtain a room effect control indication may be caused to perform at least one of: receive the room effect control indication as a flag set by an encoder of the spatial audio signal; receive the room effect control indication as a user input; determine the room effect control indication based on obtaining an indicator indicating a type of spatial audio signal; and determine the room effect control indication based on an analysis of the spatial audio signal to determine a type of spatial audio signal.

The at least one audio signal may be at least one transport audio signal generated by an encoder.

According to a fourth aspect there is provided an apparatus comprising: receiving circuitry configured to receive a spatial audio signal, the spatial audio signal comprising at least one audio signal and spatial metadata associated with the at least one audio signal; obtaining circuitry configured to obtain a room effect control indication; and determining circuitry configured to determine, based on the room effect control indication, whether a room effect is to be applied to the spatial audio signal, wherein the apparatus comprises generating circuitry configured to, when the room effect is to be applied to the spatial audio signal, generate a first part binaural audio signal based on the at least one audio signal and spatial metadata; generating circuitry configured to, when the added room effect is to be applied to the spatial audio signal, generate a second part binaural audio signal based on the at least one audio signal, at least the second part binaural audio signal is generated with at least in part the room effect so as to have a different response than a response of the first part binaural audio signal; and combining circuitry configured to combine the first part binaural audio signal and the second part binaural audio signal to generate a combined binaural audio signal.

According to a fifth aspect there is provided a computer program comprising instructions [or a computer readable medium comprising program instructions] for causing an apparatus to perform at least the following: receiving a spatial audio signal, the spatial audio signal comprising at least one audio signal and spatial metadata associated with the at least one audio signal; obtaining a room effect control indication; and determining, based on the room effect control indication, whether a room effect is to be applied to the spatial audio signal, wherein the method comprises, when the room effect is to be applied to the spatial audio signal: generating a first part binaural audio signal based on the at least one audio signal and spatial metadata; generating a second part binaural audio signal based on the at least one audio signal at least the second part binaural audio signal is generated with at least in part the room effect so as to have a different response than a response of the first part binaural audio signal; and combining the first part binaural audio signal and the second part binaural audio signal to generate a combined binaural audio signal.

According to a sixth aspect there is provided a non-transitory computer readable medium comprising program instructions for causing an apparatus to perform at least the following: receiving a spatial audio signal, the spatial audio signal comprising at least one audio signal and spatial metadata associated with the at least one audio signal; obtaining a room effect control indication; and determining, based on the room effect control indication, whether a room effect is to be applied to the spatial audio signal; generating, when the room effect is to be applied to the spatial audio signal, a first part binaural audio signal based on the at least one audio signal and spatial metadata; generating, when the room effect is to be applied to the spatial audio signal, a second part binaural audio signal based on the at least one audio signal, at least the second part binaural audio signal is generated with at least in part the room effect so as to have a different response than a response of the first part binaural audio signal; and combining, when the room effect is to be applied to the spatial audio signal, the first part binaural audio signal and the second part binaural audio signal to generate a combined binaural audio signal.

According to a seventh aspect there is provided an apparatus comprising: means for receiving a spatial audio signal, the spatial audio signal comprising at least one audio signal and spatial metadata associated with the at least one audio signal; obtaining a room effect control indication; means for determining, based on the room effect control indication, whether a room effect is to be applied to the spatial audio signal; means for generating, when the room effect is to be applied to the spatial audio signal, a first part binaural audio signal based on the at least one audio signal and spatial metadata; means for generating, when the room effect is to be applied to the spatial audio signal, a second part binaural audio signal based on the at least one audio signal, at least the second part binaural audio signal is generated with at least in part the room effect so as to have a different response than a response of the first part binaural audio signal; and means for combining, when the room effect is to be applied to the spatial audio signal, the first part binaural audio signal and the second part binaural audio signal to generate a combined binaural audio signal.

According to an eighth aspect there is provided a computer readable medium comprising program instructions for causing an apparatus to perform at least the following: receiving a spatial audio signal, the spatial audio signal comprising at least one audio signal and spatial metadata associated with the at least one audio signal; obtaining a room effect control indication; and determining, based on the room effect control indication, whether a room effect is to be applied to the spatial audio signal; generating, when the room effect is to be applied to the spatial audio signal, a first part binaural audio signal based on the at least one audio signal and spatial metadata; generating, when the room effect is to be applied to the spatial audio signal, a second part binaural audio signal based on the at least one audio signal, at least the second part binaural audio signal is generated with at least in part the room effect so as to have a different response than a response of the first part binaural audio signal; and combining, when the room effect is to be applied to the spatial audio signal, the first part binaural audio signal and the second part binaural audio signal to generate a combined binaural audio signal.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
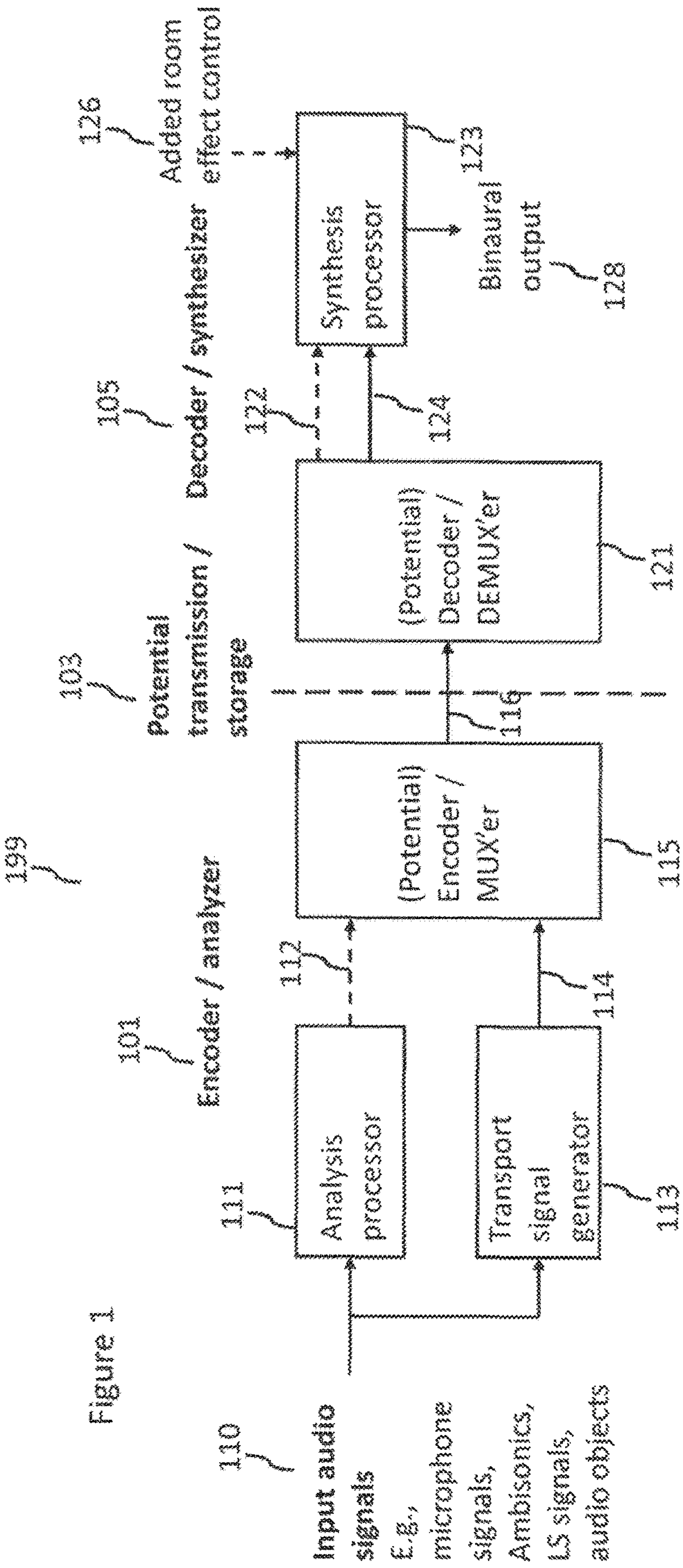
FIG. 1 shows schematically a system of apparatus suitable for implementing some embodiments.

The following describes in further detail suitable apparatus and possible mechanisms for the control and addition of room effect to rendered spatial metadata assisted audio signals.

Although the following examples focus on MASA encoding and decoding, it should be noted that the presented methods are applicable to any system that utilizes transport audio signals and spatial metadata. The spatial metadata may include, e.g., some of the following parameters in any kind of combination: Directions; Level/phase differences; Direct-to-total-energy ratios; Diffuseness; Coherences (such as spread and/surrounding coherences); and Distances. Typically, the parameters are given in the time-frequency domain. Hence, when in the following the terms IVAS and/or MASA are used, it should be understood that they can be replaced with any other suitable codec and/or metadata format and/or system.

In the following examples the IVAS stream can be decoded and rendered to a variety of output formats, including binaural, multichannel, and Ambisonic (FOA/HOA) outputs. In addition, there can be an interface for external rendering, where the output format(s) can correspond, e.g., to the input formats.

As spatial (for example MASA) metadata depicts the desired spatial audio perception in an output-format-agnostic manner, any stream with spatial metadata can be flexibly rendered to any of the aforementioned output formats. However, as the MASA stream can originate from a variety of inputs, the transport audio signals, that the decoder receives, may have different characteristics. Hence a decoder is configured to take these aspects into account in order to be able to produce optimal audio quality.

Methods for rendering parametric audio signals include in MPEG Surround, a 5.1 sound is conveyed in a form of a stereo downmix and spatial metadata that involves information to re-synthesize a 5.1 sound. Essentially the spatial metadata consists of coefficients that generate a decoding matrix for steering the stereo sound to 5.1 sound and for the application of decorrelation. In the MPEG Surround binaural decoder, these parameters are utilized to select and mix appropriate HRTFs to generate an efficient stereo-to-binaural (2×2) mixing procedure without the need to generate an intermediate 5.1 loudspeaker sound.

Furthermore rendering parametric audio signals can be implemented with directional audio coding (DirAC), which in its first form, estimates the spatial metadata based on a B-format microphone signal (consisting of four different beam patterns). At the rendering stage the microphone signals are divided into direct and ambient signals in frequency bands as a function of the diffuseness parameter (an ambience-to-total energy ratio parameter). Related to binaural reproduction, in one configuration the reproduction is implemented such that the direct part is amplitude panned to a virtual surround loudspeaker setup, the ambience is decorrelated to all or subset of the virtual loudspeaker setup, and then the virtual 3D loudspeaker signal is processed with head related transfer functions (HRTFs) to generate a binaural output.

Additionally rendering parametric audio signals can comprise a parametric spatial audio synthesis framework that avoids any intermediate signal generation (e.g., direct and ambient parts) and allows for a least-squares optimized mixing solution to generate the target spatial sound from the available audio signals directly. The approach utilizes efficiently the independent signals at the audio signals, and as such reduces the need to use the decorrelating procedures, which are known to reduce the perceived quality of the reproduced sound. The method is not a specific parametric renderer but is a method that can be applied by parametric renderers, and can be utilized, e.g., in multichannel and binaural rendering, for example in context of DirAC. This approach for example is described in further detail in Optimized covariance domain framework for time-frequency processing of spatial audio", J Vilkamo, T Bäckström, A Kuntz, Journal of the Audio Engineering Society 61, no. 6 (2013): 403-411.

The concept as discussed in the following embodiments concerns the addition of room effect to a rendered spatial audio signal. Listening to natural audio scenes in everyday environment is not only about sounds at particular directions. Even without background ambience, the majority of the sound energy arriving to the ears is not direct sounds but typically indirect sounds from the acoustic environment (i.e., reflections and reverberation). Based on the room effect, involving discrete reflections and reverberation, we auditorily perceive the source distance and room characteristics (small, big, damp, reverberant) among other features, and the room adds to the perceived feel of the audio content. In other words, the acoustic environment is a perceptually relevant feature of spatial sound.

As the listener typically listens to music in normal rooms (as opposed to, e.g. anechoic chambers), music (e.g., stereo or 5.1 channel content) is typically produced in a way that it is expected to be listened in a room with normal reverberation, which creates envelopment and spaciousness to the sound. Listening to normal music in an anechoic chamber is known to be unpleasant due to lack of room effect. Hence, normal music should be (and basically always is) listened to in normal rooms with reverberation.

Binaural spatial sound rendering of multichannel content (e.g., 5.1) using for example head related transfer function (HRTF) based rendering, corresponds to listening in an anechoic chamber. Thus, it is perceived to be unnatural and unpleasant due to the lack of the room effect. Binaural room impulse response (BRIR) based techniques for adding the room effect are typically employed for binaural rendering of multichannel content (such as 5.1).

However, there are also signal types where adding the room effect is not desired. For example binaural rendering of spatial sound captured with a mobile device. The aim in mobile-device captured audio is typically to "transport" the listener to the position where the spatial sound was captured, and to render the sound scene as faithfully as if the listener were there. The captured audio contains the natural reverberation of the recording space, so HRTF-based binaural rendering methods that do not add additional reverberation are thus preferred. Adding a room effect in the rendering would cause unnatural listening experience, as the rendered audio would contain both the room effect of the capture space and the room effect of the rendering.

Thus, there are situations that require adding a room effect in binaural rendering, and there are situations that require not adding the room effect.

The concept as discussed in further detail hereafter is the provision of apparatus and methods, for example in some embodiments a binaural renderer and/or method for binaural rendering that can operate on spatial audio streams that may contain transport audio signals (from various sources and with arbitrary properties) and spatial metadata typically containing at least directions in frequency bands (directions may have arbitrary values). Furthermore in some embodiments the binaural renderer and/or method for binaural rendering is configured to render binaural signals with and without added room effect (based on indication whether to render or not render it).

The embodiments thus relate to binaural rendering of a spatial audio stream containing transport audio signal(s) and spatial metadata (consisting of, at least, directions in frequency bands). In such embodiments a method is proposed that can render, based on the spatial audio stream (which can be from various sources such as mobile and 5.1), a binaural audio output with and without room effect. Furthermore in some embodiments this renderer is configured to perform rendering by rendering "early part" binaural signals based on the spatial metadata, binaural rendering data for early part rendering, and stochastic analysis of the transport audio signals, and rendering these signals when an indication states so, "added room effect" binaural signals (to be combined with the "early part" signals) based on binaural rendering data for added room rendering.

In some embodiments there may be a renderer and/or decoder which obtains the parametric audio stream, consisting of one or more transport audio signals and spatial metadata. The spatial audio stream can be obtained, e.g., by retrieving it from a storage or by receiving it via a network.

The spatial metadata may contain at least directions in frequency bands. These directions can point to any directions (instead of certain predefined directions, such as loudspeaker setup directions). Hence, the rendering method has to be configured to support rendering to arbitrary directions. The other parameters may include a ratio parameter indicating how directional or ambient the sound is in frequency bands. Further parameters may include if the directional sounds should be reproduced point-like or broad, or any other parameters.

In some embodiments the transport audio signals may be, for example, one of the following types (with any potential preprocessing performed): Spaced microphone signals; Coincident microphone signals; Downmix of surround loudspeaker signals; Downmix of audio objects; Ambisonic signals of any order, or a subset of Ambisonic signals of any order; a mixture of any of the above, or any other type.

The renderer further in some embodiments is configured to receive the indication on whether to render the added room response. The indication can be obtained in various ways. For example, it may be obtained from the user or it may be received alongside the spatial audio stream. It may be also determined based on the spatial audio stream. For example, if a downmix of a 5.1 sound is detected as the transport signal, then the indication may be set to "add room effect". On the other hand, if microphone signals are detected as the transport signal, then the indication may be set to "no room effect".

In some embodiments the "early part" and "room effect" binaural signals are rendered separately. The early part binaural signal may be rendered in frequency bands and thus the transport signals in some embodiments are transformed to a time-frequency domain.

In some embodiments the early part renderer is configured to perform rendering by estimating the transport signal stochastic properties (covariance matrix) in frequency bands. The covariance matrix contains information of the energies, correlation, and mutual phases of the transport channels. The information is then used to configure the rendering to adapt to various signal properties, due to the many transport audio signal types. For example, "spaced", "coincident", "downmix" types may have very differing stochastic properties even in a situation where the spatial metadata would be similar.

Furthermore in some embodiments a target covariance matrix is determined in frequency bands using the spatial metadata. For example, if a sound is arriving from a particular angle, it needs to have certain spectra at left and right ears (at each frequency) and certain phase-dependency. These are determined using the binaural rendering data for early part rendering, e.g., using an HRTF pair at that particular angle. Similarly, the ratio parameter affects how correlated the binaural output channels should be, and so forth. A target covariance matrix, that reflects all these binaural properties corresponding to the received spatial metadata, is thus built.

Then, when the transport signal covariance matrix and the target covariance matrix are known, it is possible to formulate a mixing solution. The mixing solution (in frequency bands) is such that when applied to the transport audio signals, produces an output signal that has a covariance matrix according to the determined target covariance matrix. The resulting signal is converted back into time domain, and the result is the rendered early part binaural signal.

The processing may thus be optimized for various transport signal types, due to the procedure of measuring the signal stochastic properties and configuring the processing accordingly. Such processing does not add a room effect.

In some embodiments when the indication is set to render a room effect, a room effect is rendered. The rendering of a room effect may be performed by convolving the transport audio signals with the binaural rendering data for added room rendering, which may, e.g., contain the late part of measured BRIRs. For example, it is possible to attenuate/remove from a pair of BRIRs the early/directional part and to use only the late (binaural) response as a convolution reverberator. Convolution can be implemented efficiently using FFT-based convolution techniques.

Furthermore in some embodiments the early part binaural signals and the added room effect binaural signals are combined (e.g., by summing them), resulting in a suitable output form binaural signals that can be reproduced over headphones.

In some embodiments and prior to the combining, there may be a further 'alignment' delay introduced to one of the signal pathways where one of the other path is known to have a longer delay.

Thus as a result of the rendering of the parametric spatial audio signals from various sources to a binaural output the embodiments as discussed in further detail herein can produce binaural signals that have (or do not have) added room effect (based on a suitable indication), and furthermore the binaural signals output can be optimized for the varying, non-predefined properties of the transport audio signals. The embodiments can be configured to render the audio signals to any directions.

With respect to FIG. 1 an example apparatus and system for implementing audio capture and rendering are shown according to some embodiments.

The system 199 is shown with encoder/analyser 101 part and a decoder/synthesizer 105 part.

The encoder/analyser 101 part in some embodiments comprises an audio signals input configured to receive input audio signals 110. The input audio signals can be from any suitable source, for example: two or more microphones mounted on a mobile phone; other microphone arrays, e.g., B-format microphone or Eigenmike; Ambisonic signals, e.g., first-order Ambisonics (FOA), higher-order Ambisonics (HOA); Loudspeaker surround mix and/or objects. The input audio signals 110 may be provided to an analysis processor 111 and to a transport signal generator 113.

The encoder/analyser 101 part may comprise an analysis processor 111. The analysis processor 111 is configured to perform spatial analysis on the input audio signals yielding suitable metadata 112. The purpose of the analysis processor 111 is thus to estimate spatial metadata in frequency bands. For all of the aforementioned input types, there exists known methods to generate suitable spatial metadata, for example directions and direct-to-total energy ratios (or similar parameters such as diffuseness, i.e., ambient-to-total ratios) in frequency bands. These method are detailed herein, however, some examples may comprise the performing of a suitable time-frequency transform for the input signals, and then in frequency bands when the input is a mobile phone microphone array, estimating delay-values between microphone pairs that maximize the inter-microphone correlation, and formulating the corresponding direction value to that delay (as described in GB Patent Application Number 1619573.7 and PCT Patent Application Number PCT/FI2017/050778), and formulating a ratio parameter based on the correlation value.

The metadata can be of various forms and can contain spatial metadata and other metadata. A typical parameterization for the spatial metadata is one direction parameter in each frequency band $\theta(k, n)$ and an associated direct-to-total energy ratio in each frequency band $r(k, n)$, where $k$ is the frequency band index and $n$ is the temporal frame index. Determining or estimating the directions and the ratios depends on the device or implementation from which the audio signals are obtained. For example the metadata may be obtained or estimated using spatial audio capture (SPAC) using methods described in GB Patent Application Number 1619573.7 and PCT Patent Application Number PCT/FI2017/050778. In other words, in this particular context, the spatial audio parameters comprise parameters which aim to characterize the sound-field. In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons.

When the input is a FOA signal or B-format microphone the analysis processor 111 can be configured to determine parameters such as an intensity vector, based on which the direction parameter is obtained, and comparing the intensity vector length to the overall sound field energy estimate to determine the ratio parameter. This method is known in the literature as Directional Audio Coding (DirAC).

When the input is HOA signal, the analysis processor 111 may either take the FOA subset of the signals and use the method above, or divide the HOA signal into multiple sectors, in each of which the method above is utilized. This sector-based method is known in the literature as higher order DirAC (HO-DirAC). In this case, there is more than one simultaneous direction parameter per frequency band.

When the input is loudspeaker surround mix and/or objects, the analysis processor 111 may be configured to convert the signal into a FOA signal(s) (via use of spherical harmonic encoding gains) and to analyse direction and ratio parameters as above.

As such the output of the analysis processor 111 is spatial metadata determined in frequency bands. The spatial metadata may involve directions and ratios in frequency bands but may also have any of the metadata types listed previously. The spatial metadata can vary over time and over frequency.

In some embodiments the spatial analysis may be implemented external to the system 199. For example in some embodiments the spatial metadata associated with the audio signals may be provided to an encoder as a separate bit-stream. In some embodiments the spatial metadata may be provided as a set of spatial (direction) index values.

The encoder/analyser 101 part may comprise a transport signal generator 113. The transport signal generator 113 is configured to receive the input signals and generate a suitable transport audio signal 114. The transport audio signal may be a stereo or mono audio signal. The generation of transport audio signal 114 can be implemented using a known method such as summarised below.

When the input is mobile phone microphone array audio signals, the transport signal generator 113 may be configured to select a left-right microphone pair, and applying suitable processing to the signal pair, such as automatic gain control, microphone noise removal, wind noise removal, and equalization.

When the input is a FOA/HOA signal or B-format microphone, the transport signal generator 113 may be configured to formulate directional beam signals towards left and right directions, such as two opposing cardioid signals.

When the input is loudspeaker surround mix and/or objects, the transport signal generator 113 may be configured to generate a downmix signal that combines left side channels to left downmix channel, and same for right side, and adds centre channels to both transport channels with a suitable gain.

In some embodiments the transport signal generator 113 is configured to bypass the input. For example, in some situations, where the analysis and synthesis occurs at the same device at a single processing step, without intermediate encoding. The number of transport channels can also be any suitable number (rather the one or two channels as discussed in the examples).

In some embodiments the encoder/analyser part 101 may comprise an encoder/multiplexer 115. The encoder/multiplexer 115 can be configured to receive the transport audio signals 114 and the metadata 112. The encoder/multiplexer 115 may furthermore be configured to generate an encoded or compressed form of the metadata information and transport audio signals. In some embodiments the encoder/multiplexer 115 may further interleave, multiplex to a single data stream 116 or embed the metadata within encoded audio signals before transmission or storage. The multiplexing may be implemented using any suitable scheme.

The encoder/multiplexer 115 for example could be implemented as an IVAS encoder, or any other suitable encoder. The encoder/multiplexer 115 thus is configured to encode the audio signals and the metadata and form a bit stream 116 (e.g., an IVAS bit stream).

This bitstream 116 may then be transmitted/stored 103 as shown by the dashed line. In some embodiments there is no encoder/multiplexer 115 (and thus no decoder/demultiplexer 121 as discussed hereafter).

The system 199 furthermore may comprise a decoder/synthesizer part 105. The decoder/synthesizer part 105 is configured to receive, retrieve or otherwise obtain the bitstream 116, and from the bitstream generate suitable audio signals to be presented to the listener/listener playback apparatus.

The decoder/synthesizer part 105 may comprise a decoder/demultiplexer 121 configured to receive the bitstream and demultiplex the encoded streams and then decode the audio signals to obtain the transport signals 124 and metadata 122.

Furthermore in some embodiments, as discussed above there may not be any demultiplexer/decoder 121 (for example where there is no associated encoder/multiplexer 115 as both the encoder/analyser part 101 and the decoder/synthesizer 105 are located within the same device).

The decoder/synthesizer part 105 may comprise a synthesis processor 123. The synthesis processor 123 is configured to obtain the transport audio signals 124, the spatial metadata 122 and an added room effect control signal or indicator and produces a binaural output signal 128 that can be reproduced over headphones.

Figure 2:
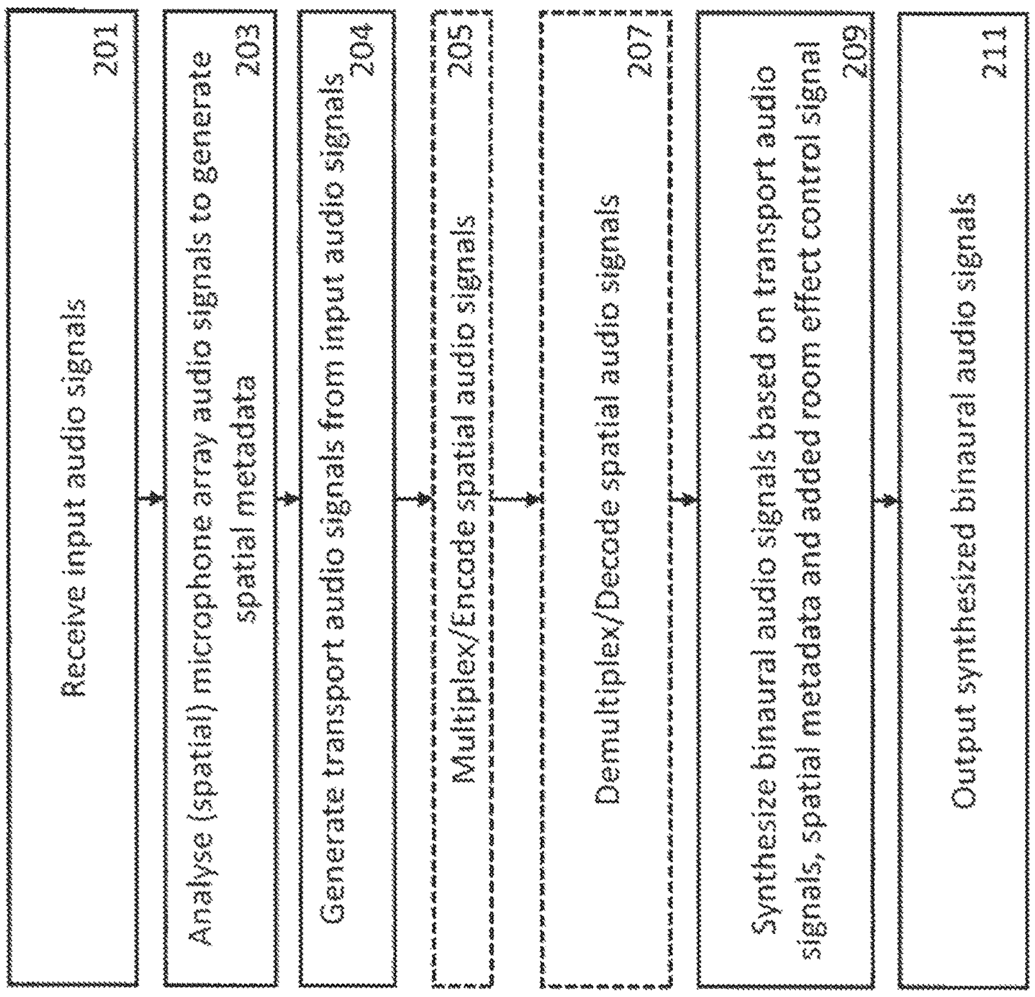
FIG. 2 shows a flow diagram of the operation of the example apparatus according to some embodiments.

The operations of this system are summarized with respect to the flow diagram as shown in FIG. 2. FIG. 2 shows for example the receiving of the input audio signals as shown in step 201.

Then the flow diagram shows the analysis (spatial) of the input audio signals to generate the spatial metadata as shown in FIG. 2 by step 203.

The transport audio signals are then generated from the input audio signals as shown in FIG. 2 by step 204.

The generated transport audio signals and the metadata may then be multiplexed as shown in FIG. 2 by step 205. This is shown in FIG. 2 as an optional dashed box.

The encoded signals can furthermore be demultiplexed and decoded to generate transport audio signals and spatial metadata as shown in FIG. 2 by step 207. This is also shown as an optional dashed box.

Then binaural audio signals can be synthesized based on the transport audio signals, spatial metadata and an added room effect control signal or indicator as shown in FIG. 2 by step 209.

The synthesized binaural audio signals may then be output to a suitable output device, for example a set of headphones, as shown in FIG. 2 by step 211.

Figure 3:
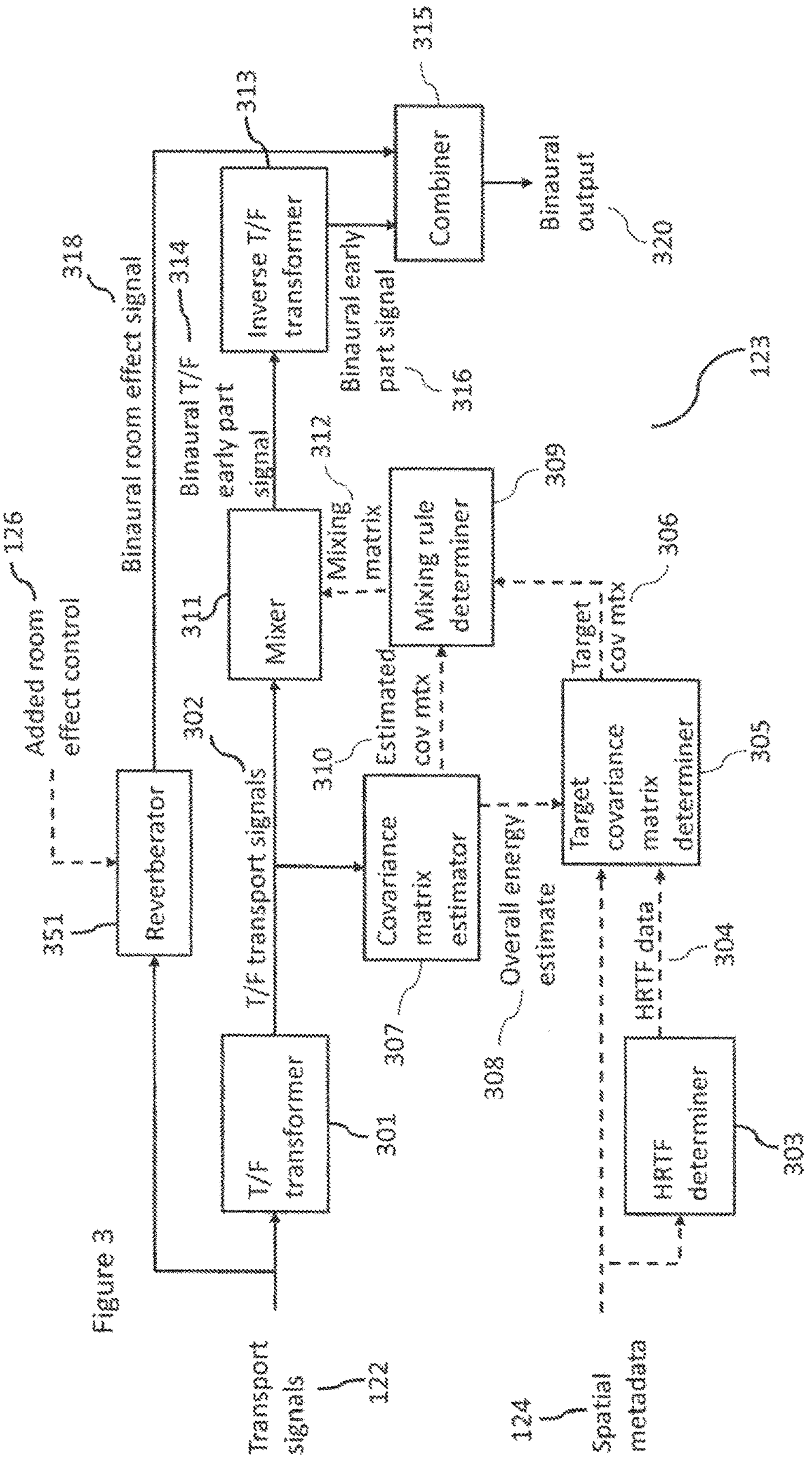
FIG. 3 shows schematically a synthesis processor as shown in FIG. 1 according to some embodiments.

With respect to FIG. 3 is shown the synthesis processor 123 in further detail.

In some embodiments the synthesis processor 123 comprises a time-frequency transformer 301. The time-frequency transformer 301 is configured to receive the (time-domain) transport audio signals 122, which converts them to the time-frequency domain. Suitable transforms include, e.g., short-time Fourier transform (STFT) and complex-modulated quadrature mirror filterbank (QMF). The resulting signals may be denoted as $x_i(b, n)$, where i is the channel index, b the frequency bin index of the time-frequency transform, and n the time index. The time-frequency signals are for example expressed here in a vector form (for example for two channels the vector form is):

$$x(b, n) = \begin{bmatrix} x_1(b, n) \\ x_2(b, n) \end{bmatrix}$$

The following processing operations may then be implemented within the time-frequency domain and over frequency bands. A frequency band can be one or more frequency bins (individual frequency components) of the applied time-frequency transformer (filter bank). The frequency bands could in some embodiments approximate a perceptually relevant resolution such as the Bark frequency bands, which are spectrally more selective at low frequencies than at the high frequencies. Alternatively, in some implementations, frequency bands can correspond to the frequency bins. The frequency bands are typically those (or approximate those) where the spatial metadata has been determined by the analysis processor. Each frequency band k may be defined in terms of a lowest frequency bin $b_{low}(k)$ and a highest frequency bin $b_{high}(k)$.

The time-frequency transport signals 302 in some embodiments may be provided to a covariance matrix estimator 307 and to a mixer 311.

The synthesis processor 123 in some embodiments comprises a covariance matrix estimator 307. The covariance matrix estimator 307 is configured to receive the time-frequency domain transport signals 302 and estimates a covariance matrix of the time-frequency transport signals and their overall energy estimate (in frequency bands). The covariance matrix can for example in some embodiments be estimated as:

$$C_x(k, n) = \sum_{b=b_{low}(k)}^{b_{high}(k)} x(b, n)\, x^H(b, n).$$

where superscript H denotes the conjugate transpose. The estimation of the covariance matrix may involve temporal averaging, such as IIR averaging or FIR averaging over several time indices n. The estimated covariance matrix 310 may be output to a mixing rule determiner 309.

The covariance matrix estimator 307 may also be configured to generate an overall energy estimate E(k, n) 308, that is the sum of the diagonal values of $C_x(k,n)$, and provides this overall energy estimate to a target covariance matrix determiner 305.

In some embodiments the synthesis processor 123 comprises a HRTF determiner 303. The HRTF determiner 303 may comprise a suitably dense set of HRTFs or a HRTF interpolator. The HRTF determiner is configured to determine a 2×1 complex-valued head-related transfer function (HRTF) h(θ(k, n), k) for an angle θ(k, n) and frequency band k. In some embodiments the HRTF determiner 303 is configured to receive the spatial metadata 124 and from the angle θ(k, n) (which is the direction parameter at the spatial metadata) determine the output HRTF.

For example, it may determine the HRTF at the middle frequency of band k. Where the listener head-orientation tracking is involved, the direction parameters θ(k, n) can be modified prior to obtaining the HRTFs to account for the current head orientation. The HRTF data set of the HRTF determiner 303 can in some embodiments be pre-formulated and fixed for the synthesis processor 123, and there can be multiple HRTF data sets to select from.

The HRTF data set of the HRTF determiner 303 in some embodiments also has a diffuse-field covariance matrix for each band k, which may be formulated for example by taking an equally distributed set of directions $\theta_d$ where d=1 . . . . D, and by estimating the diffuse-field covariance matrix as $$C_D(k) = \frac{1}{D}\sum_{d=1}^{D} h(\theta_d, k)\, h^H(\theta_d, k).$$

The HRTF data may be rendered and interpolated by using any suitable method. For example, in some embodiments, a set of HRTFs is decomposed into inter-aural time differences and energies of left and right ears as a function of frequency. Then, when a HRTF at a given angle is needed, then the nearest existing data points at the HRTF set are found and the delays and energies at the given angle are interpolated. These energies and delays can be then converted as complex multipliers to be used.

In some embodiments HRTFs are interpolated to convert a HRTF data set into a set of spherical harmonic binaural decoding matrices in frequency bands. Then, the HRTF for any angle can be determined by formulating a spherical harmonic weight vector for that angle and multiplying it with that matrix. The result is again the 2×1 HRTF vector.

In some embodiments interpolation of HRTFs can be implemented by treating them as virtual loudspeakers and to obtain the interpolated HRTFs, e.g., via amplitude panning.

A HRTF, by definition, refers to a response from a certain direction to the ears in an anechoic space. However, it is entirely possible to use in place of a HRTF data set another data set which includes (additionally to the HRTF part) also early part of a binaural room impulse response. Such a data set also includes spectral and other features that are for example due to first floor or wall reflections.

The HRTF data 304 (which consists of h(θ(k, n), k) and $C_D(k)$) can be output by the HRTF determiner 303 and passed to a target covariance matrix determiner 305.

In some embodiments the synthesis processor 123 comprises a target covariance matrix determiner 305. The target covariance matrix determiner 305 is configured to receive the spatial metadata 124 which can in this example comprise at least one direction parameter θ(k, n) and at least one direct-to-total energy ratio parameter r(k, n), the HRTF data 304 and the overall energy estimate E(k, n) 308. The covariance matrix determiner 305 is then configured to determine a target covariance matrix 306 based on the spatial metadata 124, the HRTF data 304 and the overall energy estimate 308. For example the target covariance matrix determiner 305 may formulate the target covariance matrix by $$C_y(k, n) = E(k, n)\, r(k, n)\, h(\theta(k, n), k)\, h^H(\theta(k, n), k) + E(k, n)(1 - r(k, n))\, C_D(k)$$

The target covariance matrix $C_y(k, n)$ 306 can then be provided to the mixing rule determiner 309.

The synthesis processor 123 in some embodiments comprises a mixing rule determiner 309. The mixing rule determiner 309 is configured to receive the target covariance matrix 306 and the estimated covariance matrix 310. The mixing rule determiner 309 is configured to generate a mixing matrix M(k, n) 312 based on the target covariance matrix $C_y$(k, n) 306 and the measured covariance matrix $C_x$(k, n) 310.

In some embodiments the mixing matrix is generated based on a method described in "Optimized covariance domain framework for time-frequency processing of spatial audio", J Vilkamo, T Bäckström, A Kuntz, Journal of the Audio Engineering Society 61, no. 6 (2013): 403-411.

In some embodiments the mixing rule determiner 309 is configured to determine a prototype matrix $$Q = \begin{bmatrix} 1 & 0 \\ 0 & 1 \end{bmatrix}$$

that guides the generation of the mixing determine a prototype matrix matrix.

In summary a mixing matrix M(k, n) may be provided that when applied to a signal with a covariance matrix $C_x$(k, n) it produces a signal with covariance matrix $C_y$(k, n), in a least-squares optimized way. Matrix Q guides the signal content in such mixing, and in this example that matrix is simply the identity matrix, since the left and right processed signals should resemble as much as possible the original left and right signals. In other words, the design is to minimally alter the signals while obtaining $C_y$(k, n) for the processed output. The mixing matrix M(k, n) is formulated for each frequency band k and is provided to the mixer 311.

In this example the mixing matrix is defined based on the input being a two channel transport audio signal. However these methods can be adapted to embodiments for any number of transport audio channels.

The synthesis processor 123 in some embodiments comprises a mixer 311. The mixer 311 receives the time-frequency audio signals 302 and the mixing matrices 312. The mixer 311 is configured to process the time-frequency audio signals (input signal) in each frequency bin b to generate two processed (first or early part) time-frequency signals 314. This may, for example be formed based on the following expression:

$$y(b, n) = \begin{bmatrix} y_1(b, n) \\ y_2(b, n) \end{bmatrix} = M(k, n)x(b, n)$$

where band k is the band where bin b resides.

The above procedure assumes that the input signals x(b, n) have suitable incoherence between them to render an output signal y(b, n) with the desired target covariance matrix properties. In some situations the input signal does not have suitable inter-channel incoherence, for example, when there is only a single channel transport signal, or the signals are otherwise highly correlated. Therefore in some embodiments decorrelating operations are implemented to generate decorrelated signals based on x(b, n), and to mix the decorrelated signals into a particular residual signal that is added to the signal y(b, n) in the above equation. The procedure of obtaining such a residual signal is known, and for example has been described in the above reference article.

The processed binaural (early part) time-frequency signal y(b, n) 314 is provided to an inverse T/F transformer 313.

In some embodiments the synthesis processor 123 comprises an inverse T/F transformer 313 configured to receive the binaural (early part) time-frequency signal y(b, n) 314 and apply an inverse time-frequency transform corresponding to the applied time-frequency transform applied by the T/F transformer 301. The output of the inverse T/F transformer 313 is a binaural (early part) signal 316 corresponding to the early/dry part of the binaural processing (i.e., not containing late reverberation).

The above procedures thus account for the (first) early/dry part of the binaural processing, and the following processes account for the (second) late/wet part of the binaural processing.

In some embodiments the synthesis processor 123 comprises a reverberator 351 configured to receive the transport audio signals 122 and apply a time-domain reverberation operation to the transport audio signals 122 to generate a late reverberation binaural room effect signal 318 based on the added room effect control (indicator) 126. However the reverberator in some embodiments comprises a time-frequency domain reverberator, which if implemented would be configured to receive time-frequency transport signals (for example such as produced by the T/F transformer 301) and the output of which would be mixed or combined with the output of the mixer 311 (or combined to the binaural T/F early part signal 314 within the mixer), before the inverse T/F transformer 313.

The reverberator 351 is configured to also receive an added room effect control signal or information 126 that includes an indication of whether a room effect (i.e., binaural reverberation) should be output. Where no room effect should be output the reverberator 351 is configured to provide no output. Where room effect should be output then the reverberator may be configured to add a room effect as described in further detail hereafter.

The determination or obtaining of the added room effect control 126 can be based on any suitable method. For example, in some embodiments the added room effect control 126 may be obtained from the user. In some further embodiments the added room effect control 126 may be received alongside the spatial audio stream (e.g. a flag set by the encoder among the spatial metadata). The added room effect control 126 may be determined based on the spatial audio stream. For example the added room effect control 126 may be determined based on the type of the spatial audio signal (e.g. the bit stream contains an indication that the spatial audio signal originates from a 5.1 surround mix, then the decoder knows to render the room effect). In some embodiments the added room effect control may be determined based on an analysis of the spatial audio signal. For example, the audio signals and metadata are monitored to determine whether the spatial audio signals originate from a 5.1 channel signal or some other type in which an added room effect is desired, rather than for example from a spatial audio capture system such as a mobile phone capturing spatial audio where an added room effect is not desired since the necessary ambience and/or reverberation in such a case already exists in the spatial audio signals.

For example, if a downmix of a 5.1 sound is detected as the transport signal, then the indication may be set to "add room effect". On the other hand, if microphone signals are detected as the transport signal, then the indication may be set to "no room effect". In some embodiments, the added room effect control may have also other information controlling the reverberation, for example the reverberation times and overall levels as a function of frequency.

The reverberator 351 may implement any suitable reverberation method to generate a reverberation. For example in some embodiments the reverberator 351 is configured to perform convolution with pre-defined reverberation responses. The convolution can be applied efficiently using Fast Fourier Transform (FFT) convolution or partial FFT convolution, for example such as described within Gardner, William G. "Efficient convolution without input/output delay." In Audio Engineering Society Convention 97. Audio Engineering Society, 1994.

The reverberation responses may be obtained for example from binaural room impulse responses (BRIRs) by appropriate windowing where the first or early part (corresponding to the HRTF/dry rendering) of the BRIRs is attenuated fully, leaving only the second or late part. Such responses can be applied at the efficient convolution operation to generate the binaural room effect signal.

In some embodiments the transport audio signals are summed to a single channel to be processed with a pair of reverberation responses. As in a typical set of BRIRs there are responses from several directions, the reverberation response could be windowed from one of the responses in the set, such as the centre front BRIR. The reverberation response could also be a combined (e.g. averaged) response based on BRIRs from multiple directions.

In some embodiments the transport audio channels are processed with different pairs of reverberation responses, and the result is summed together to obtain a two-channel output. In this case, the reverberation response for the left-side transport signal could be windowed for example from the 90-degrees left BRIR, and correspondingly to the right side. In these embodiments, the reverberation responses could also be a combined (e.g., averaged) based on BRIRs from multiple directions.

In some embodiments the reverberator comprises a feedback delay network (FDN) which is a time-domain reverberator, or a sparse frequency domain reverberator such as described in Vilkamo, J., Neugebauer, B. and Plogsties, J., "Sparse frequency-domain reverberator", Journal of the Audio Engineering Society, 59(12), pp. 936-943. In such embodiments it may be possible to perceptually approximate an existing late reverberation response by any reverberator structure that allows to configure reverberation times (T60, i.e., the time it takes for sound to attenuate by 60 dB) and energies in frequency bands. These reverberation parameters of a reverberator algorithm can be set to match the corresponding properties of the existing response that is being approximated. The reverberator parameters may also be manually configured if the aim is not to mimic an existing late part response.

The late reverberation for binaural output should be generated such that it matches the diffuse field correlation as a function of frequency, which is a feature that has been accounted for various known methods. The diffuse field correlation for a frequency band can be obtained from the diffuse field covariance matrix $C_D(k)$.

The binaural room effect signal 318 (the reverberation processed time-domain signal) can then be provided to the combiner 315.

The combiner 315 is configured to receive the early (Binaural early part signal 316 from the inverse T/F transformer 313) and the late (Binaural room effect signal 318 from the reverberator 351) and combine or sum these together (for the left and right channels separately). Thus the combination combines the binaural time-domain signal corresponding to the early/dry part of the binaural processing and the binaural room effect signal to produce the resultant spatialized binaural time-domain signal that has the added room effect when required/requested. This signal may be reproduced over headphones.

Figure 4:
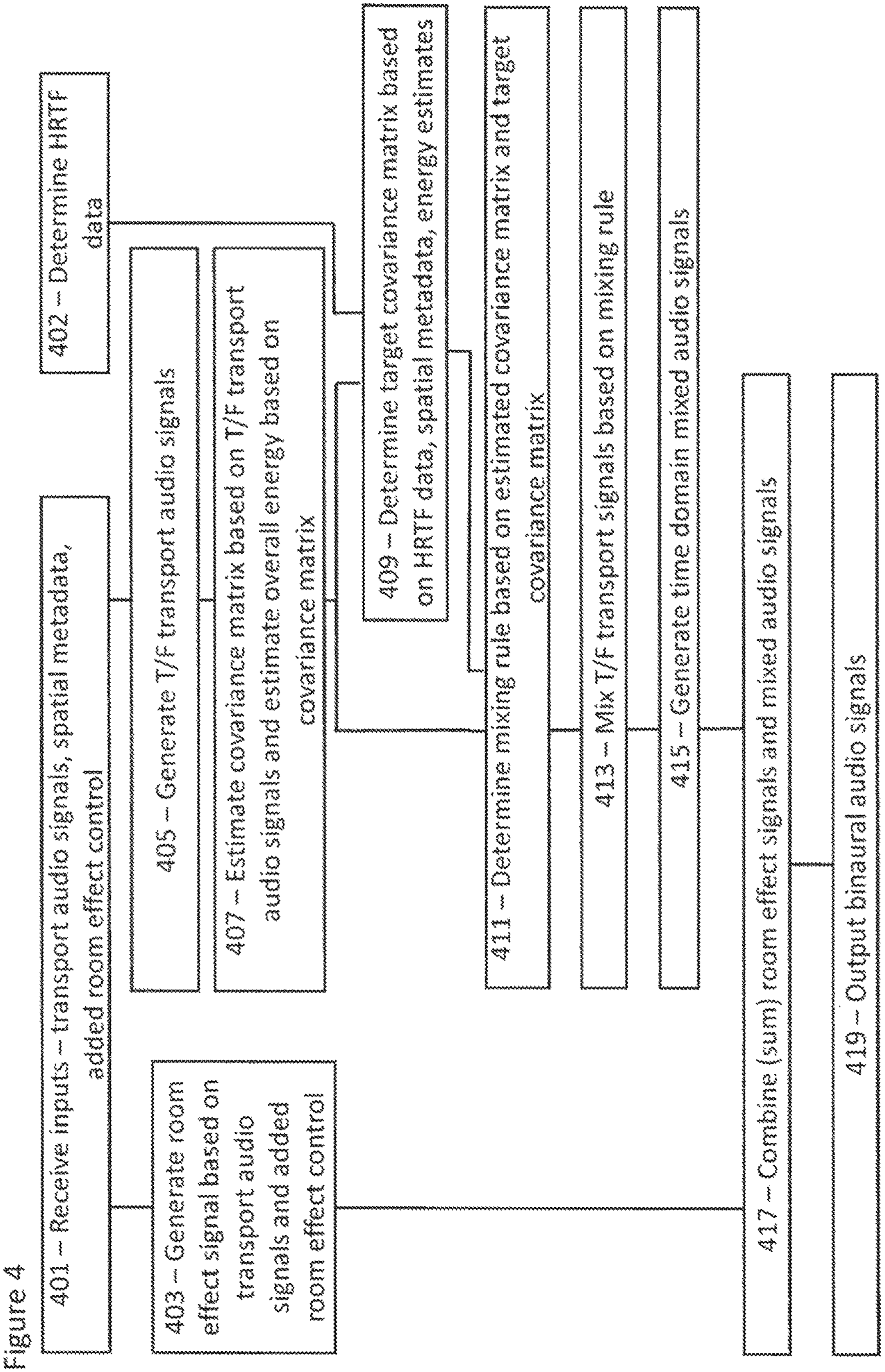
FIG. 4 shows a flow diagram of the operation of the example apparatus as shown in FIG. 3 according to some embodiments.

With respect to FIG. 4 a flow diagram showing the operation of the synthesis processor is shown.

The flow diagram shows the operation of receiving such as the transport audio signals, spatial metadata, and added room effect control indicator as shown in FIG. 4 by step 401.

Furthermore the HRTF data is determined as shown in FIG. 4 by step 402. The generation of a room effect binaural audio signals based on transport audio signals and added room effect control is shown in FIG. 4 by step 403.

The generation of the time-frequency domain transport audio signals is shown in FIG. 4 by step 405.

The estimation of the covariance matrix based on the T/F transport audio signals and the overall energy based on the covariance matrix is shown in FIG. 4 by step 407.

The determination of the target covariance matrix based on HRTF data, spatial metadata, energy estimates is shown in FIG. 4 by step 409.

Having determined the target covariance matrix and the estimated covariance matrix then the mixing rule is determined based on the estimated covariance matrix and target covariance matrix as shown in FIG. 4 by step 411.

The time-frequency transport signals can then be mixed based on mixing rule as shown in FIG. 4 by step 413.

These mixed audio signals are then converted back to the time domain, or time domain equivalent audio signals are generated as shown in FIG. 4 by step 415.

The room effect binaural audio signals (where required) and the early mixed audio signals may then be combined (or summed) as shown in FIG. 4 by step 417.

The combined binaural audio signals may then be output as shown in FIG. 4 by step 419.

In some embodiments it is possible to utilize the spatial metadata to control the late reverberation processing. A key purpose of the binaural reverberation in context of binaural reproduction is to enable sound externalization/distance perception. Therefore, in some situations it may be useful to render the reverberation to direct sounds more than to the ambience part. Therefore, the direct-to-total energy ratio parameter (or an equivalent parameter) could be applied to control the signal that is fed to the reverberator. This can be achieved with multiplying the transport signals in frequency bands by $\sqrt{(r(k,n))}$ prior to the application of the reverberator and using a frequency domain binaural reverberator algorithm. Furthermore, any kind of control to the amount of signal provided to the reverberator based on the spatial metadata may be implemented.

Figure 5:
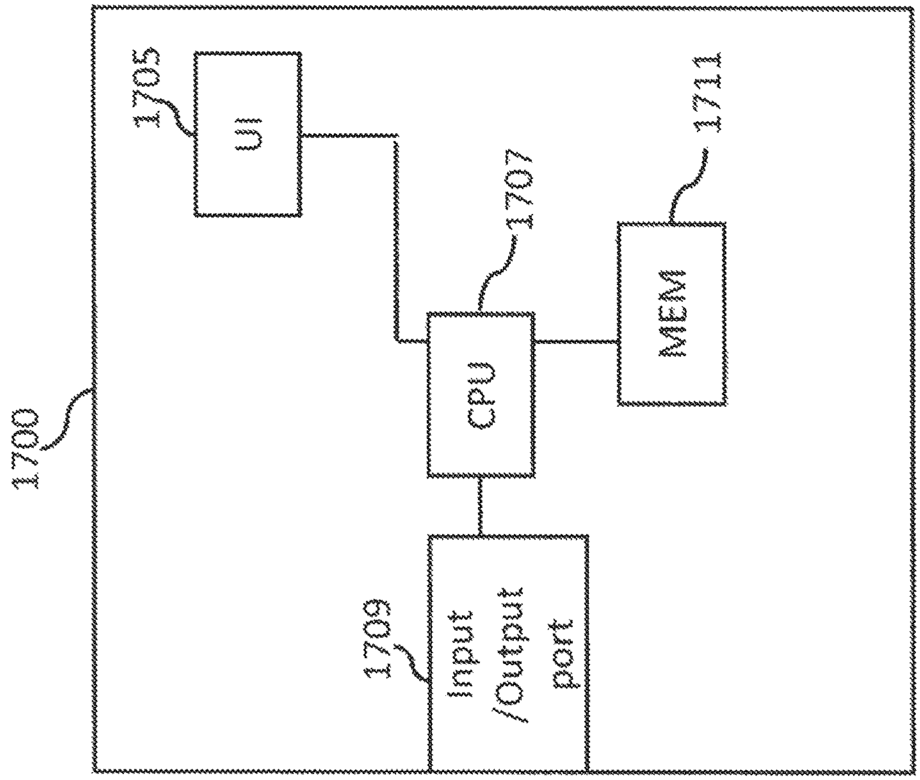
FIG. 5 shows an example device suitable for implementing the apparatus shown in previous figures.

With respect to FIG. 5 an example electronic device which may be used as any of the apparatus parts of the system as described above. The device may be any suitable electronics device or apparatus. For example in some embodiments the device 1700 is a mobile device, user equipment, tablet computer, computer, audio playback apparatus, etc. The device may for example be configured to implement the encoder/analyser part 101 or the decoder/synthesizer part 105 as shown in FIG. 1 or any functional block as described above.

In some embodiments the device 1700 comprises at least one processor or central processing unit 1707. The processor 1707 can be configured to execute various program codes such as the methods such as described herein.

In some embodiments the device 1700 comprises a memory 1711. In some embodiments the at least one processor 1707 is coupled to the memory 1711. The memory 1711 can be any suitable storage means. In some embodiments the memory 1711 comprises a program code section for storing program codes implementable upon the processor 1707. Furthermore in some embodiments the memory 1711 can further comprise a stored data section for storing data, for example data that has been processed or to be processed in accordance with the embodiments as described herein. The implemented program code stored within the program code section and the data stored within the stored data section can be retrieved by the processor 1707 whenever needed via the memory-processor coupling.

In some embodiments the device 1700 comprises a user interface 1705. The user interface 1705 can be coupled in some embodiments to the processor 1707. In some embodiments the processor 1707 can control the operation of the user interface 1705 and receive inputs from the user interface 1705. In some embodiments the user interface 1705 can enable a user to input commands to the device 1700, for example via a keypad. In some embodiments the user interface 1705 can enable the user to obtain information from the device 1700. For example the user interface 1705 may comprise a display configured to display information from the device 1700 to the user. The user interface 1705 can in some embodiments comprise a touch screen or touch interface capable of both enabling information to be entered to the device 1700 and further displaying information to the user of the device 1700. In some embodiments the user interface 1705 may be the user interface for communicating.

In some embodiments the device 1700 comprises an input/output port 1709. The input/output port 1709 in some embodiments comprises a transceiver. The transceiver in such embodiments can be coupled to the processor 1707 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1709 may be configured to receive the signals.

In some embodiments the device 1700 may be employed as at least part of the synthesis device. The input/output port 1709 may be coupled to headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one memory storing instructions that, when executed with the at least one processor, cause the apparatus at least to:

obtain one or more parameter values for configuring a reverberator;

receive a spatial audio signal, the spatial audio signal comprising at least one audio signal and spatial metadata associated with the at least one audio signal;

obtain a room effect control indication;

determine, based on the room effect control indication, whether a room effect is to be applied to the at least one audio signal; and based on a determination that the room effect is to be applied to the spatial audio signal:

generate a first part binaural audio signal based on the at least one audio signal and the spatial metadata;

generate a second part binaural audio signal based on the at least one audio signal, wherein at least the second part binaural audio signal is generated with at least in part the room effect, wherein the second part binaural audio signal comprises a different response than a response of the first part binaural audio signal, wherein the second part binaural audio signal is generated with the reverberator that is configured with at least one parameter value of the one or more parameter values; and combine the first part binaural audio signal and the second part binaural audio signal to generate a combined binaural audio signal.

2. The apparatus of claim 1, wherein the one or more parameter values for configuring the reverberator comprises at least one of:

at least one reverberation time;

reverberation times in at least two frequencies;

at least one parameter defining a level of reverberation;

parameters defining levels of reverberation in the at least two frequencies;

at least one pre-defined reverberation response; or a diffuseness parameter.

3. The apparatus of claim 1, wherein the reverberator comprises at least one of:

a fast Fourier transform based convolution;

a partial fast Fourier transform based convolution;

a feedback delay network;

a time-domain reverberator; or a sparse frequency domain reverberator.

4. The apparatus as claimed in claim 1, wherein the spatial metadata comprises at least one direction parameter, wherein the at least one memory stores instructions that, when executed with the at least one processor, cause the apparatus to:

generate the first part binaural audio signal based on the at least one audio signal and the at least one direction parameter.

5. The apparatus as claimed in claim 4, wherein the at least one direction parameter comprises a direction associated with a frequency band.

6. The apparatus as claimed in claim 1, wherein the spatial metadata comprises at least one ratio parameter, wherein the at least one memory stores instructions that, when executed with the at least one processor, cause the apparatus to:

generate the first part binaural audio signal based on the at least one audio signal and the at least one ratio parameter.

7. The apparatus as claimed in claim 1, wherein the at least one memory stores instructions that, when executed with the at least one processor, cause the apparatus to:

analyse the at least one audio signal to determine at least one stochastic property associated with the at least one audio signal; and generate the first part binaural audio signal further based on the at least one stochastic property associated with the at least one audio signal.

8. The apparatus as claimed in claim 7, wherein the at least one audio signal comprises at least two audio signals, wherein analysing the at least one audio signal to determine the at least one stochastic property comprises the at least one memory stores instructions that, when executed with the at least one processor, cause the apparatus to:

estimate a covariance between the at least two audio signals, wherein the first part binaural audio signal is generated further based on the at least one stochastic property, wherein generating the first part binaural audio signal comprises the at least one memory stores instructions that, when executed with the at least one processor, cause the apparatus to:

generate mixing coefficients based on the estimated covariance between the at least two audio signals; and mix the at least two audio signals based on the mixing coefficients to generate the first part binaural audio signal.

9. The apparatus as claimed in claim 8, wherein the at least one memory stores instructions that, when executed with the at least one processor, cause the apparatus to:

generate the mixing coefficients further based on a target covariance.

10. The apparatus as claimed in claim 9, wherein the at least one memory stores instructions that, when executed with the at least one processor, cause the apparatus to:

generate an overall energy estimate based on the estimated covariance;

determine a head related transfer function based on at least one direction parameter, wherein the spatial metadata comprises the at least one direction parameter; and determine the target covariance based on the head related transfer function, the spatial metadata and the overall energy estimate.

11. The apparatus as claimed in claim 1, wherein the at least one memory stores instructions that, when executed with the at least one processor, cause the apparatus to at least one of:

receive the room effect control indication as a flag set with an encoder;

receive the room effect control indication as a user input;

determine the room effect control indication based on an indicator indicating a type of the spatial audio signal; or determine the room effect control indication based on an analysis of the spatial audio signal to determine the type of the spatial audio signal.

12. The apparatus as claimed in claim 1, wherein the at least one audio signal comprises at least one transport audio signal generated with an encoder.

13. A method comprising:

obtaining one or more parameter values for configuring a reverberator;

receiving a spatial audio signal, the spatial audio signal comprising at least one audio signal and spatial metadata associated with the at least one audio signal;

obtaining a room effect control indication;

determining, based on the room effect control indication, whether a room effect is to be applied to the at least one audio signal; and based on a determination that the room effect is to be applied to the spatial audio signal:

generating a first part binaural audio signal based on the at least one audio signal and the spatial metadata;

generating a second part binaural audio signal based on the at least one audio signal, wherein at least the second part binaural audio signal is generated with at least in part the room effect, wherein the second part binaural audio signal comprises a different response than a response of the first part binaural audio signal, wherein the second part binaural audio signal is generated with the reverberator that is configured with at least one parameter value of the one or more parameter values; and combining the first part binaural audio signal and the second part binaural audio signal to generate a combined binaural audio signal.

14. The method of claim 13, wherein the one or more parameter values for configuring the reverberator comprises at least one of:

at least one reverberation time;

reverberation times in frequency bands in at least two frequencies;

at least one parameter defining a level of reverberation;

parameters defining levels of reverberation in the at least two frequencies;

at least one pre-defined reverberation response; or a diffuseness parameter.

15. The method of claim 13, wherein the reverberator comprises at least one of:

a fast Fourier transform based convolution;

a partial fast Fourier transform based convolution;

a feedback delay network;

a time-domain reverberator; or a sparse frequency domain reverberator.

16. The method of claim 13, wherein the spatial metadata comprises at least one direction parameter, the method further comprising:

generating the first part binaural audio signal based on the at least one audio signal and the at least one direction parameter.

17. The method of claim 13, wherein the spatial metadata comprises at least one ratio parameter, the method further comprising:

generating the first part binaural audio signal based on the at least one audio signal and the at least one ratio parameter.

18. The method of claim 13, further comprising:

analysing the at least one audio signal to determine at least one stochastic property associated with the at least one audio signal; and generating the first part binaural audio signal further based on the at least one stochastic property associated with the at least one audio signal.

19. The method of claim 13, further comprising at least one of:

receiving the room effect control indication as a flag set with an encoder;

receiving the room effect control indication as a user input;

determining the room effect control indication based on an indicator indicating a type of the spatial audio signal; or determining the room effect control indication based on an analysis of the spatial audio signal to determine the type of the spatial audio signal.

20. A computer-readable medium comprising program instructions that, when exucuted by an apparatus, cause the apparatus to perform at least the following:

causing obtaining of one or more parameter values for configuring a reverberator;

causing receiving of a spatial audio signal, the spatial audio signal comprising at least one audio signal and spatial metadata associated with the at least one audio signal;

causing obtaining of a room effect control indication;

determining, based on the room effect control indication, whether a room effect is to be applied to the at least one audio signal; and based on a determination that the room effect is to be applied to the spatial audio signal:

generating a first part binaural audio signal based on the at least one audio signal and the spatial metadata;

generating a second part binaural audio signal based on the at least one audio signal, wherein at least the second part binaural audio signal is generated with at least in part the room effect, wherein the second part binaural audio signal comprises a different response than a response of the first part binaural audio signal, wherein the second part binaural audio signal is generated with the reverberator that is configured with at least one parameter value of the one or more parameter values; and combining the first part binaural audio signal and the second part binaural audio signal to generate a combined binaural audio signal.

* * * * *